(12) United States Patent
Liang et al.

(10) Patent No.: US 8,909,238 B2
(45) Date of Patent: Dec. 9, 2014

(54) METHOD AND DEVICE FOR UTILIZING CELL EDGE FREQUENCY BAND RESOURCE AND BASE STATION

(75) Inventors: Zheng Liang, Shenzhen (CN); Bingguang Peng, Shenzhen (CN); Dan Li, Shenzhen (CN); Han Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 400 days.

(21) Appl. No.: 13/538,969

(22) Filed: Jun. 29, 2012

(65) Prior Publication Data

US 2012/0270584 A1    Oct. 25, 2012

Related U.S. Application Data

(63) Continuation of application No. PCT/CN2010/080302, filed on Dec. 27, 2010.

(30) Foreign Application Priority Data

Dec. 31, 2009    (CN) .......................... 2009 1 0216975

(51) Int. Cl.
*H04W 72/00* (2009.01)
*H04W 48/16* (2009.01)
*H04W 28/04* (2009.01)

(52) U.S. Cl.
CPC .............. *H04W 48/16* (2013.01); *H04W 28/04* (2013.01); *H04W 28/048* (2013.01); *H04W 72/00* (2013.01)
USPC ......... 455/450; 455/451; 455/452.1; 455/509

(58) Field of Classification Search
CPC ... H04W 48/16; H04W 28/04; H04W 28/048; H04W 72/00

USPC ........... 455/422.1, 450–453, 456.2, 464, 509, 455/510, 443, 444, 447; 370/395.41, 332; 375/E7.141
See application file for complete search history.

(56) References Cited

U.S. PATENT DOCUMENTS

2006/0079235 A1*   4/2006   Kim ............................ 455/439
2007/0054667 A1*   3/2007   Lee et al. .................... 455/434

(Continued)

FOREIGN PATENT DOCUMENTS

CN            1983918 A         6/2007
CN          101018220 A         8/2007

(Continued)

OTHER PUBLICATIONS

"Combining Inter-cell-interference co-ordination/avoidance with cancellation in uplink and TP," 3GPP TSG-RAN WG1 LTE Ad Hoc Meeting, Helsinki, Finland, R1-060419, Jan. 23-25, 2006, 4 pages.

(Continued)

*Primary Examiner* — Dominic E Rego
(74) *Attorney, Agent, or Firm* — Slater & Matsil, L.L.P.

(57) ABSTRACT

Embodiments of the present invention disclose a method, a device and a base station for utilizing cell edge frequency band resources, and are related to the field of mobile communications. The method includes: receiving a message transmitted from another cell, wherein the message is used for indicating information of an edge frequency band resource block used by the another cell; acquiring information of a remaining available resource block; and according to the acquired information of the remaining available resource block, utilizing the remaining available resource block according to a set probability that a current cell utilizes each remaining available resource block.

20 Claims, 2 Drawing Sheets

(56) References Cited

U.S. PATENT DOCUMENTS

| | | | |
|---|---|---|---|
| 2007/0207812 A1* | 9/2007 | Borran et al. | 455/452.1 |
| 2009/0143078 A1* | 6/2009 | Tu et al. | 455/456.3 |
| 2009/0199244 A1* | 8/2009 | Woch et al. | 725/62 |
| 2009/0285208 A1* | 11/2009 | Lu | 370/389 |
| 2010/0003985 A1* | 1/2010 | Jang et al. | 455/436 |
| 2010/0291940 A1* | 11/2010 | Koo et al. | 455/450 |

FOREIGN PATENT DOCUMENTS

| | | | |
|---|---|---|---|
| CN | 101242640 A | | 8/2008 |
| CN | 101304594 A | | 11/2008 |
| CN | 101765210 A | | 6/2010 |
| EP | 1 784 031 A1 | | 5/2007 |
| EP | 1 811 699 A1 | | 7/2007 |
| WO | WO 95/17048 A1 | | 6/1995 |
| WO | WO 2007/068198 A1 | | 6/2007 |

OTHER PUBLICATIONS

International Search Report received in Patent Cooperation Treaty Application No. PCT/CN2010/080302, mailed Mar. 26, 2011, 3 pages.

Written Opnion of the International Searching Authority received in Patent Cooperation Treaty Application No. PCT/CN2010/080302, mailed Mar. 26, 2011, 6 pages.

"3$^{rd}$ Generation Partnership Project; Technical Specification Group Radio Access Network; Physical Layer Aspects for Evolved UTRA (Release 7)," 3GPP TR 25.814 V1.1.1, Feb. 2006, 85 pages.

"Standard aspects of Interference coordination for EUTRA," 3GPP TSG RAN WG1#42bis, R1-051051, San Diego, USA, Oct. 10-14, 2005, 3 pages.

"Some Clarifications of Soft Frequency Reuse Scheme," 3GPP TSG-RAN WG1 Meeting Ad Hoc LTE, Tdoc R1-060229, Helsinki, Finland, Jan. 23-25, 2006, 3 pages.

* cited by examiner

US 8,909,238 B2

METHOD AND DEVICE FOR UTILIZING CELL EDGE FREQUENCY BAND RESOURCE AND BASE STATION

This application is a continuation of co-pending International Application No. PCT/CN2010/080302, filed Dec. 27, 2010, which designated the United States and was not published in English, and which claims priority to Chinese Application No. 200910216975.7, filed Dec. 31, 2009, both of which applications are incorporated herein by reference.

TECHNICAL FIELD

The present invention relates to the field of the wireless communications technologies, and in particular, to a method and a device for utilizing cell edge frequency band resources, and a base station.

BACKGROUND

3GPP (3rd Generation Partnership Project, 3rd generation partnership project) LTE (Long Term Evolution, long term evolution) adopts OFDM (Orthogonal Frequency Division Multiplexing, orthogonal frequency division multiplexing) as a core transmission technology thereof. In the case of same-frequency networking, limited frequency band resources may be reused periodically outside a cell. Therefore, interference inevitably exists between adjacent cells, and management and coordination are required.

At present, two major solutions are usually adopted for ICIC (Intercell interference coordination, intercell interference coordination), namely, intercell static coordination and intercell dynamic coordination. In the intercell static coordination solution, a CEU (Cell Edge User, cell edge user) of each cell uses a part of a whole available frequency band, which is usually set to ⅓. In addition, frequencies utilized by CEUs of adjacent cells of different base stations are orthogonal to each other. Each cell allocates, to the edge user thereof, a RB (Resource Block, resource block) with orthogonal frequencies, so as to reduce the intercell interference. In the cell dynamic coordination solution, the part of the whole available frequency band utilized by the CEU of each cell may expand and shrink along with a traffic intensity of a serving cell.

However, in both the intercell static coordination technology and the intercell dynamic coordination technology, a certain RB margin usually exists between adjacent cells. At this time, if adjacent cells both occupy the remaining RBs between them completely, severe intercell interference is caused, and if neither of the adjacent cells occupies the remaining RBs between them, a waste of the resources is caused. It can be seen that, how to reasonably and effectively utilize the remaining RBs between the adjacent cells is an urgent problem to be solved in the ICIC (intercell interference coordination) technology currently.

SUMMARY OF THE INVENTION

Embodiments of the present invention provide a method, a device, and a base station for utilizing cell edge frequency band resources, so as to reasonably and effectively utilize remaining RBs between adjacent cells in an ICIC technology.

An embodiment of the present invention provides a method for utilizing cell edge frequency band resources, which includes the following steps:

receiving a message transmitted from another cell, wherein the message is used for indicating information of an edge frequency band resource block used by the another cell;

acquiring information of a remaining available resource block of a current cell according to the information of the edge frequency band resource block utilized by the another cell and information of an edge frequency band resource block utilized by the current cell; and according to the acquired information of the remaining available resource block, utilizing the remaining available resource block based on a set probability that each remaining available resource block is utilized by the current cell.

An embodiment of the present invention further provides a device for utilizing cell edge frequency band resources, which includes:

a receiver;

a processor communicatively connected to the receiver;

wherein the receiver is configured to receive a message transmitted from another cell, wherein the message is used for indicating information of an edge frequency band resource block used by the another cell;

the processor is configured to acquire information of a remaining available resource block of a current cell according to the information of the edge frequency band resource block utilized by the another cell and information of an edge frequency band resource block utilized by the current cell, and according to the acquired information of the remaining available resource block, to utilize the remaining available resource block according to a set probability that each remaining available resource block is utilized by the current cell.

An embodiment of the present invention further provides a base station, which includes a device for utilizing cell edge frequency band resources.

In the embodiments of the present invention, a message transmitted from another cell for indicating information of an edge frequency band resource block utilized by the another cell is received, information of a remaining available resource block is acquired according to the information of the edge frequency band resource block utilized by the another cell and information of an edge frequency band resource block utilized by a current cell, and the remaining available resource block is utilized according to a utilization probability set for the remaining available resource block, when edge frequency band resources are adjusted, interference caused during unordered contention for the remaining available resource blocks by each cell is effectively controlled (or avoided), and a waste of resources caused when the remaining available resource blocks are not used by each cell is avoided, thereby further improving the resource utilization ratio and fairness while ensuring a lower conflict probability.

DETAILED DESCRIPTION OF ILLUSTRATIVE EMBODIMENTS

In order to make the objectives, technical solutions, and advantages of the present invention more clearly, the technical solutions of the present invention is described in further detail below with reference to embodiments and the accompanying drawings.

Figure 1:
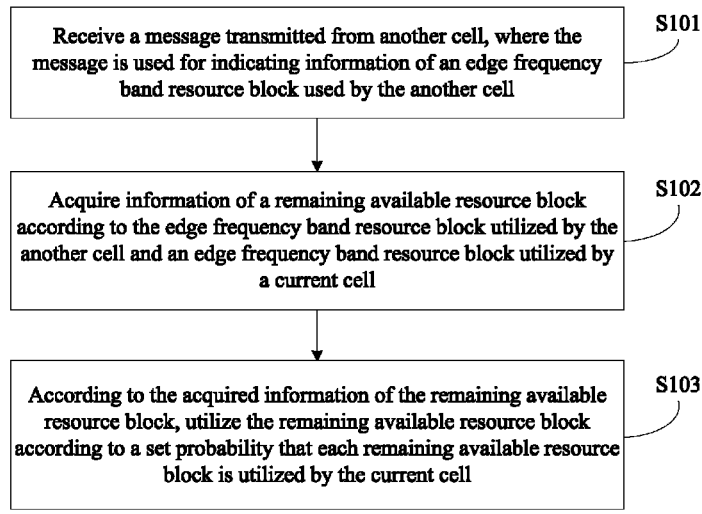
FIG. 1 is a flow chart of a method for utilizing cell edge frequency band resources provided by an embodiment of the present invention.

Referring to FIG. 1, an embodiment of the present invention provides a method for utilizing cell edge frequency band resources, which includes:

S101: Receive a message transmitted from another cell, where the message is used for indicating information of an edge frequency band resource block used by the another cell.

The message for indicating the information of the edge frequency band resource block utilized by the another cell may be an HII message. For a format of the HII message, reference may be made to relevant descriptions in a protocol, which is not described herein again. The "another cell" herein may indicate one cell or multiple cells. Generally, the HII message is point-to-point. If the "another cell" indicates multiple cells, the information of the edge frequency band resource blocks utilized by the cells may be indicated through multiple HII messages, respectively.

S102: Acquire information of a remaining available resource block according to the edge frequency band resource block utilized by the another cell and edge frequency band resource block utilized by a current cell.

The information of the edge frequency band resources utilized by the another cell may be obtained according to a bitmap (bitmap) in the HII message, while a resource block not utilized may be obtained with reference to information of the edge frequency band resource block utilized by the current cell, and the resource block not utilized may be referred to as the remaining available resource block.

S103: According to the acquired information of the remaining available resource block, utilize the remaining available resource block based on a set probability that the each remaining available resource block is utilized by the current cell.

The utilization probability may be any value between 0 and 1. The utilization probability of each remaining resource block may be set in multiple manners. For example, a utilization probability of a resource block initially and statically allocated to the cell may be set to a large value, such as 0.9 or other values; the utilization probability may also be set according to other factors and demands. The utilization probability may be pre-set to a fixed value; alternatively, the utilization probability of each remaining available resource block may be set after the remaining available resource block is determined. The probability that each resource block is utilized may be set to the same value, or set to a different value, which is not limited in this embodiment.

The utilizing the remaining available resource block according to the probability that each remaining available resource block is utilized by the current cell refers to that, the current cell utilizing the remaining available resource block is regarded as a probability event, and a probability that each remaining available resource block is utilized is equal to the set probability that each remaining available resource block is utilized by the current cell.

It should be noted that, a sum of set probabilities that the current cell and any other cell use the same resource block may be any value between 0 and 2, and the remaining resource block may be reused by different cells.

In the embodiments of the present invention, a message transmitted from another cell for indicating information of an edge frequency band resource block utilized by the another cell is received, information of a remaining available resource block is acquired according to the information of the edge frequency band resource block utilized by the another cell and information of the edge frequency band resource block utilized by the current cell, and the remaining available resource block is utilized according to the utilization probability set for the remaining available resource block, so that when edge frequency band resources are adjusted, interference that is caused when each cell disorderly contends for the remaining available resource blocks is effectively controlled (or avoided), and a waste of resources caused when the remaining available resource blocks are not used by each cell is avoided, thereby further improving the resource utilization ratio and fairness while ensuring a lower conflict probability.

It should be noted that, the acquiring the information of the remaining available resource block according to the information of the edge frequency band resource block utilized by the another cell and the information of the edge frequency band resource block utilized by the current cell may be implemented in multiple manners.

For example, in an embodiment of the present invention, the following manner may be adopted: according to the information of the edge frequency band resource block utilized by the another cell and the information of the edge frequency band resource block utilized by the current cell, acquiring information of an edge frequency band resource block not utilized by the current cell and the another cell in resource blocks of a full frequency range to serve as the information of the remaining available resource block of the current cell.

In addition, in another embodiment of the present invention, the following manner may also be adopted: according to pre-set correspondence between cells and modes, and a characteristic resource block of a mode, acquiring utilization information of an available edge frequency band resource block of the current cell, and using information of a resource block not utilized by the another cell and the current cell in the available edge frequency band resource block of the current cell as the information of the remaining available resource block of the current cell, where the characteristic resource block is a dedicated resource block designated for each mode beforehand.

The correspondence between cells and modes may be set on the basis that adjacent cells correspond to different modes, and may also be set on the basis that cells belonging to different base stations correspond to different modes.

A resource block dedicated to each mode may be designated for the mode beforehand, which is referred to as a characteristic resource block of the mode, and the characteristic resource block can only be utilized by a cell corresponding to the mode. Edge frequency band resources between characteristic resource blocks of adjacent modes may be utilized by cells corresponding to the two adjacent modes.

For example, 3 modes are used in total, where a characteristic resource block of mode 1 is resource block 2, a characteristic resource block of mode 2 is resource block 6, and a characteristic resource block of mode 3 is resource block 11. It is assumed that the full frequency range has 12 resource blocks in total, which are circularly permutated according to a frequency sequence (the resource block with a higher frequency has a larger sequence number; or, the resource block with a higher frequency has a smaller sequence number, which is not limited in this embodiment). Then, resource block 2 can only be utilized by a cell corresponding to mode 1, resource block 6 can only be utilized by a cell corresponding to mode 2, and resource block 11 can only be utilized by a cell corresponding to mode 3. Resource blocks 3, 4, and 5 between resource block 2 and resource block 6 may be utilized by cells corresponding to mode 1 and mode 2, and resource blocks 12 and 1 between resource block 2 and resource block 11 may be utilized by cells corresponding to mode 1 and mode 3, and resource blocks 7, 8, 9, and 10 between resource block 6 and resource block 11 may be utilized by cells corresponding to the mode 2 and the mode 3.

First, the utilization information of the available edge frequency band resource blocks of the current cell is acquired according to the pre-set correspondence between cells and modes, and the mode characteristic resource block.

It is assumed that the current cell corresponds to mode 1. Then, the utilization information of the available edge frequency band resource blocks of the current cell, that is, resource blocks 12, 1, 2, 3, 4, and 5, is acquired according to the correspondence between cells and modes, and the characteristic resource block.

Then, information of resource blocks not utilized by the another cell and the current cell in the available edge frequency band resource blocks of the current cell is used as the information of the remaining available resource blocks of the current cell. That is, information of the resource blocks not utilized by the current cell and the another cell in the resource blocks 12, 1, 2, 3, 4, and 5 is used as the information of the remaining available resource blocks of the current cell.

One of possible implementation manners of acquiring the utilization information of the available edge frequency band resource blocks of the current cell according to the pre-set correspondence between cells and modes, and the mode characteristic resource block may be described as follows:

The mode to which the current cell belongs receives a message transmitted from another cell, where the message is used for indicating information of an edge frequency band resource block used by the another cell. Information of the available resource blocks of the current cell that are utilized by the another cell is combined according to the correspondence between cells and modes, and the mode characteristic resource block, so as to obtain the utilization information of the available edge frequency band resource blocks of the current cell.

Figure 2:
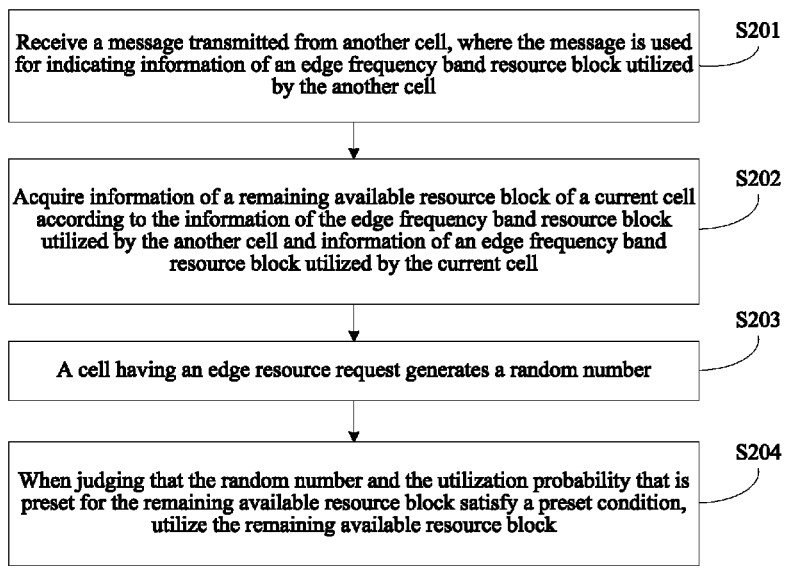
FIG. 2 is a flow chart of another method for utilizing cell edge frequency band resources provided by an embodiment of the present invention.

As for the utilizing the remaining available resource blocks according to the set probability that the current cell utilizes each remaining available resource block, the current cell utilizing the remaining available resource blocks may be construed as a probability event, and specifically, the probability event may be simulated according to the manner of the embodiment shown in FIG. 2.

Referring to FIG. 2, an embodiment of the present invention provides another method for utilizing cell edge frequency band resources, which includes:

S201: Receive a message transmitted from another cell, where the message is used for indicating information of an edge frequency band resource block used by the another cell.

The message may be an HII message. In actual applications, the message may be obtained in other manners, which is not limited in the embodiment of the present invention.

S202: Acquire information of a remaining available resource block of a current cell according to the information of the edge frequency band resource block utilized by the another cell and information of an edge frequency band resource block utilized by the current cell.

For the technical feature of acquiring the information of the remaining available resource block of the current cell, reference may be made to the technical feature in the foregoing method embodiment, which is not described herein again.

S203: The current cell generates a random number when an edge resource request exists.

When it is obtained that remaining resource block is available according to the information of the remaining available resource block acquired in S202, the cell generates the random number when the edge resource request exists.

S204: When the random number and a utilization probability pre-set for a remaining available resource block satisfy a pre-set condition, utilize the remaining available resource block.

An implementation manner of S203 and S204 may include the following sub-steps.

Sub-step A: Generate a random number according to pre-set probability density.

Sub-step B: When the random number belongs to a probability distribution subinterval pre-set for the remaining available resource block, determine that the remaining available resource block is available, where the probability distribution subinterval pre-set for the remaining available resource block is set based on such a rule that the integration of the pre-set probability density at the probability distribution subinterval is equal to the utilization probability of the remaining available resource block.

Specifically, a random number generator obeying certain distribution may be selected to determine the distribution range of the random number, and since the distribution of the random number is known, a corresponding probability density function may be obtained.

One subinterval or multiple subintervals are selected in a distribution interval of the random number, so that the integration of the probability density function of the random number at the subinterval or a set of subintervals is the utilization probability pre-set for the remaining available resource block.

The random number generator generates a random number, and judges whether the random number belongs to the foregoing determined subinterval. If yes, it is considered that the probability event occurs, and the remaining available resource block may be utilized; otherwise, it is considered that the probability event does not occur, and the remaining available resource block cannot be utilized.

An example is taken for illustration:

1) It is assumed that a generator generating random numbers in uniform distribution from 0 to 1 is selected. Then a distribution range of a random number is [0, 1]. Due to the uniform distribution, the probability density function is f(x) =1.

2) It is assumed that a utilization probability value pre-set for the remaining available resource block is 0.9. Due to the uniform distribution, one interval or multiple intervals are randomly selected from 0 to 1, so long as an interval length is 0.9. For convenience, a subinterval of [0, 0.9] is selected.

3) The random number generator generates a random number. If the random number falls within the interval of [0, 0.9] (that is, as long as the random number is smaller than or equal to 0.9), it is considered that the probability event occurs, and the remaining available resource block may be allocated; otherwise, the remaining available resource block cannot be allocated.

In an embodiment of the present invention, a method for pre-setting a utilization probability for the resource block may be:

setting utilization probabilities of edge frequency band resource blocks initially allocated to the current cell to 1;

according to a frequency ascending direction and starting from a last edge frequency band resource block initially allocated to the current cell for utilization, gradually decreasing the utilization probability set for each resource block; or according to a frequency descending direction and starting from a last edge frequency band resource block initially allocated to the current cell for utilization, gradually decreasing the utilization probability set for each resource block.

It is assumed that a cell having an edge resource request is cell A. Then, for cell A, the edge frequency band resource blocks initially allocated to the current cell for utilization are resource blocks 1, 2, 3, and 4, and the utilization probabilities set for the edge frequency band resource blocks initially allocated to the current cell for utilization are 1.

According to the frequency ascending direction and starting from the last edge frequency band resource block initially allocated to the current cell for utilization, the gradually decreasing the utilization probability set for each resource block may be implemented in the following manners:

(1) A utilization probability is set for each resource block, and the set utilization probabilities are decreased gradually, that is, according to the frequency ascending direction and starting from resource block 4, utilization probabilities set for resource blocks 5, 6, 7, and 8 are decreased gradually. For example, the utilization probability of resource block 5 is set to 0.9, the utilization probability of resource block 6 is set to 0.8, the utilization probability of resource block 7 is set to 0.7, and the utilization probability of resource block 8 is set to 0.6.

(2) Only one utilization probability is set, and each resource block is available under the premise that a previous resource block is available, that is, when a current resource block is available, it is determined whether a next resource block is available according to the pre-set utilization probability. Therefore, a conditional probability is formed. Actually, the probabilities of the resource blocks are also decreased gradually. For example: the utilization probability is set to 0.9, and starting from resource block 4, the utilization probability of resource block 5 is 0.9. When resource block 5 is available, the utilization probability of resource block 6 is 0.9, and when resource block 5 is not available, resource block 6 and subsequent resource blocks are not available. Seen separately, the utilization probability of resource block 6 is 0.9*0.9=0.81; in the same way, when resource block 6 is available, the utilization probability of resource block 7 is 0.9. Seen separately, the utilization probability of resource block 7 is 0.81*0.9=0.729. The rest may be deduced by analogy. It can be seen that, according to the frequency ascending direction, the utilization probabilities of the resource blocks are decreased gradually.

In the frequency descending direction, a probability that a resource block utilized by the current cell may be set according to a similar method.

According to the frequency descending direction and starting from the last edge frequency band resource block initially allocated to the current cell for utilization, the utilization probability set for each resource block is decreased gradually. That is, according to the frequency descending direction and starting from resource block 1, the utilization probabilities set for resource blocks 12, 11, 10, and 9 are decreased gradually. For example, the utilization probability set for resource block 12 is 0.95, the utilization probability set for resource block 11 is 0.85, the utilization probability set for resource block 10 is 0.75, and the utilization probability set for the resource block 9 is 0.65.

Correspondingly, when the random number and the utilization probability pre-set for the remaining available resource block satisfy a pre-set condition, the remaining available resource block is utilized. The random number and the utilization probability pre-set for the remaining available resource block satisfying the pre-set condition may be that, the random number is smaller than or equal to the utilization probability pre-set for the remaining available resource block. That is to say, a conclusion that the probability event occurs is obtained according to the utilization probability pre-set for the remaining available resource block and a criteria for judging whether the probability event occurs (that is, whether the random number belongs to the probability distribution subinterval pre-set for the remaining available resource block).

In actual applications, the utilizing the remaining available resource block according to the set probability that the current cell utilizes each remaining available resource block may be implemented in multiple manners. An implementation solution is introduced in the following: starting from the last resource block initially allocated to the current cell for utilization, a remaining available resource block that can be used by the current cell is determined according to the frequency ascending direction and the frequency descending direction of the resource blocks respectively. Specifically:

When a cell has an edge frequency utilization demand, two random numbers are generated.

One of the random numbers is used as a basis. Starting from a resource block initially allocated to the cell for utilization and according to the frequency ascending direction of resource blocks, it is judged whether the random number falls within a pre-set probability distribution subinterval of a remaining available resource block of the cell; if yes, and the remaining available resource block is utilized.

In addition, the other random number is used as a basis. Starting from the resource block initially allocated to the cell for utilization and according to the frequency descending direction of the resource blocks, it is judged whether the random number falls within a pre-set probability distribution subinterval of a remaining available resource block of the cell; if yes, the remaining available resource block is utilized.

In addition, the method for pre-setting the utilization probability of the resource block may further be: setting utilization probabilities of edge frequency band resource blocks initially allocated to the current cell for utilization to 0;

according to the frequency ascending direction and starting from the last edge frequency band resource block initially allocated to the current cell for utilization, gradually increasing the utilization probability set for each resource block;

according to the frequency descending direction and starting from the last edge frequency band resource block initially allocated to the current cell for utilization, gradually increasing the utilization probability set for each resource block.

Generally, the utilization probability of each resource block may be set beforehand. In this way, the utilization probability of each resource block may be compared with a pre-set utilization probability of a resource block under a remaining available state according to a generated random number in applications, and the resource block is utilized according to the pre-set probability, without the need of performing the setting each time when edge frequency band resources are utilized.

In the embodiments of the present invention, a message transmitted from another cell for indicating information of an edge frequency band resource block utilized by the another cell is received, information of a remaining available resource block is acquired according to the information of the edge frequency band resource block utilized by the another cell and information of an edge frequency band resource block utilized by a current cell, and the remaining available resource block is utilized according to the utilization probability set for the remaining available resource block, so that when edge frequency band resources are adjusted, interference caused when each cell disorderly contends for the remaining available resource blocks is effectively controlled (or avoided), and a waste of resources caused when the remaining available resource block is not used by each cell is avoided, thereby further improving the resource utilization ratio and fairness while ensuring a lower conflict probability.

Figure 3:
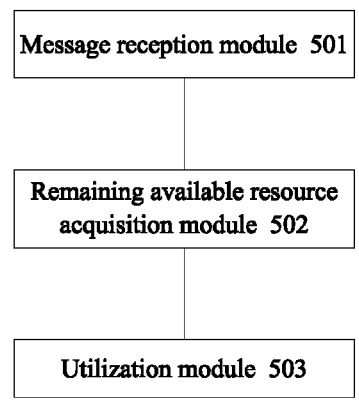
FIG. 3 is a structural block diagram of a device for utilizing cell edge frequency band resources provided by an embodiment of the present invention.

Referring to FIG. 3, an embodiment of the present invention further provides a device for utilizing cell edge frequency band resources, which includes the following modules.

A message reception module 501 is configured to receive a message transmitted from another cell, where the message is used for indicating information of an edge frequency band resource block utilized by the another cell.

The message for indicating the information of the edge frequency band resource block utilized by the another cell may be an HII message, and for a format of the HII message, reference may be made to relevant descriptions in a protocol, which is not described herein again. The "another cell" herein may indicate one cell or multiple cells. Generally, the HII message is point-to-point. If the "another cell" indicates multiple cells, the information of the edge frequency band resource blocks utilized by the cells may be indicated through multiple HII messages, respectively.

A remaining available resource acquisition module 502 is configured to acquire information of a remaining available resource block according to the information of the edge frequency band resource block utilized by the another cell and information of an edge frequency band resource block utilized by a current cell.

Information of edge frequency band resources utilized by the another cell may be obtained according to a bitmap (bitmap) in the HII message, while a resource block not utilized may be obtained with reference to the information of the edge frequency band resource block utilized by the current cell, and the resource block not utilized may be referred to as the remaining available resource block.

A utilization module 503 is configured to, according to the acquired information of the remaining available resource block, utilize the remaining available resource block based on a set probability that each remaining available resource block is utilized by the current cell.

The utilizing the remaining available resource block based on the probability that the current cell utilizes each remaining available resource block refers to that, the current cell utilizing the remaining available resource block is regarded as a probability event, and a probability that each remaining available resource block is utilized is equal to the set probability that the current cell utilizes each remaining available resource block.

In an embodiment of the present invention, the remaining available resource acquisition module 502 includes:

a first remaining available resource acquisition sub-module, configured to, according to the information of the edge frequency band resource block utilized by the another cell and the information of the edge frequency band resource block utilized by the current cell, acquire information of an edge frequency band resource block not utilized by the current cell and the another cell in resource blocks of a full frequency range to serve as the information of the remaining available resource block of the current cell; or a second remaining available resource acquisition sub-module, configured to, according to pre-set correspondence between cells and modes, and a characteristic resource block of a mode, acquire utilization information of available edge frequency band resource block of the current cell; and use information of resource block not utilized by the another cell and the current cell in the available edge frequency band resource block of the current cell as the information of the remaining available resource block of the current cell, where the characteristic resource block is a dedicated resource block designated for each mode beforehand.

Figure 4:
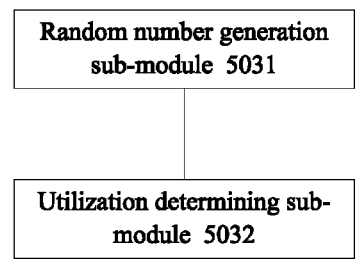
FIG. 4 is a is a structural block diagram of modules used in an embodiment of the present invention.

In another embodiment of the present invention, referring to FIG. 4, the utilization module 503 may include:

a random number generation sub-module 5031, configured to generate a random number according to pre-set probability density; and a utilization determining sub-module 5032, configured to determine that a remaining available resource block is available when it is judged that the random number belongs to a probability distribution subinterval pre-set for the remaining available resource block; where the probability distribution subinterval pre-set for the remaining available resource block is set based on such a rule that the integration of the pre-set probability density at the probability distribution subinterval is equal to a utilization probability of the remaining available resource block.

The device embodiment of the present invention further includes:

a probability setting module, configured to pre-set values of probabilities that the current cell utilizes the resource blocks in the full frequency range; or, after the remaining available resource acquisition module acquires the information of the remaining available resource block of the current cell, set a value of a probability that the current cell utilizes each remaining available resource block.

The probability setting module sets the utilization probabilities of the resource blocks through following manner.

Starting from a last edge frequency band resource block initially allocated to the current cell and according to a frequency ascending direction or a frequency descending direction of the resource blocks, the probability that the current cell utilizes each resource block is decreased gradually.

In the embodiment of the present invention, setting the utilization probability for each remaining available resource block may be pre-setting values of probabilities that the current cell utilizes the resource blocks in the full frequency range; or, after acquiring the information of the remaining available resource block of the current cell, setting the value of the probability that the current cell utilizes each remaining available resource block.

For example, starting from the last edge frequency band resource block initially allocated to the current cell and according to the frequency ascending direction or the frequency descending direction of the resource blocks, the probability that the current cell utilizes each resource block is decreased gradually.

It should be noted that, the current cell utilizing the remaining available resource block is regarded as a probability event, and a probability that each remaining available resource block is utilized is equal to the set probability that the current cell utilizes each remaining available resource block.

It should be noted additionally that, for an operating principle and a processing procedure of each module or each sub-module in the device embodiment, reference may be made to relevant descriptions in the foregoing method embodiment, which are not described herein again.

In the embodiments of the present invention, a message transmitted from another cell for indicating information of an edge frequency band resource block utilized by the another cell is received, information of a remaining available resource block is acquired according to the information of the edge frequency band resource block utilized by the another cell and information of an edge frequency band resource block utilized by a current cell, and a remaining available resource block is utilized according to the utilization probability set for the remaining available resource block, so that when edge frequency band resources are adjusted, interference caused when each cell disorderly contends for the remaining available resource blocks is effectively controlled (or avoided), and a waste of resources caused when the remaining available resource blocks are not used by each cell is avoided, thereby further improving the resource utilization ratio and fairness while ensuring a lower conflict probability.

In addition, an embodiment of the present invention provides a base station, which includes a device for utilizing cell edge frequency band resources of the embodiment shown in FIG. 3 or FIG. 4.

For the technical feature of the device for utilizing cell edge frequency band resources included in this base station, reference may be made to the technical features in the foregoing method embodiment and the device embodiment, which is not described herein again.

With the base station provided by the embodiment of the present invention, when edge frequency band resources are adjusted, interference caused when each cell disorderly contends for remaining available resource blocks can be effectively controlled or (avoided), and a waste of resources caused when the remaining available resource block is not used by each cell can be prevented, thereby further improving the resource utilization ratio and fairness while ensuring a lower conflict probability.

It should be noted that, in this specification, relationship terms, such as first and second, are merely used to distinguish an entity or operation from another entity or operation, but do not necessarily require or imply any actual relationship or sequence among these entities or operations. The term "include," "contain" or any other variation is intended to cover non-exclusive inclusion, so that the process, method, object or device including a series of elements not only include those elements, but also include other elements not explicitly listed, or further include inherent elements of the process, method, object, or device. In a condition without more limitations, the element limited by the phrase "including one . . . " does not exclude other same elements in the process, method, object or device that includes the element.

Persons of ordinary skill in the art should understand that, all of or a part of the steps in the method according to the embodiments may be implemented by a program instructing relevant hardware. The program may be stored in a computer readable storage medium, and when the program is executed, several instructions are included to execute the method described in each embodiment of the present invention. The storage medium herein includes a ROM/RAM, a magnetic disk, and an optical disk.

The above descriptions are merely exemplary embodiments of the present invention, but not intended to limit the protection scope of the present invention. Any modifications, equivalent replacements, or improvements made without departing from the idea and principle of the present invention should fall within the protection scope of the present invention.

What is claimed is:

1. A method for utilizing cell edge frequency band resources, the method comprising:
   receiving a message transmitted from another cell, wherein the message is used for indicating information of an edge frequency band resource block used by the another cell;
   acquiring information of a remaining available resource block of a current cell according to the information of the edge frequency band resource block utilized by the another cell and information of an edge frequency band resource block utilized by the current cell; and
   according to the acquired information of the remaining available resource block, utilizing the remaining available resource block based on a set probability that each remaining available resource block is utilized by the current cell.

2. The method according to claim 1, wherein acquiring the information comprises acquiring information of an edge frequency band resource block not utilized by the current cell and the another cell in resource blocks of a full frequency range to serve as the information of the remaining available resource block of the current cell, the information acquired according to the information of the edge frequency band resource block utilized by the another cell and the information of the edge frequency band resource block utilized by the current cell.

3. The method according to claim 1, wherein acquiring the information comprises:
   acquiring utilization information of available edge frequency band resource block of the current cell according to pre-set correspondence between cells and modes and a characteristic resource block of a mode; and
   using information of a resource block not utilized by the another cell and the current cell in the available edge frequency band resource block of the current cell as the information of the remaining available resource block of the current cell;
   wherein the characteristic resource block is a dedicated resource block pre-designated for each mode.

4. The method according to claim 1, wherein the probability that each remaining available resource block is utilized by the current cell is set by:
   pre-setting values of probabilities that the resource blocks of a full frequency range are utilized by the current cell; or
   after acquiring the information of the remaining available resource block of the current cell, setting a value of the probability that the current cell utilizes each remaining available resource block.

5. The method according to claim 4, wherein the probability that each remaining available resource block is utilized by the current cell is set by setting a value of the probability that the current cell utilizes each remaining available resource block, the setting comprising starting from a last edge frequency band resource block initially allocated to the current cell and, according to a frequency ascending direction or a frequency descending direction of the resource blocks, gradually decreasing the probability that the current cell utilizes each resource block.

6. The method according to claim 1, wherein utilizing the remaining available resource block comprises regarding the current cell utilizing the remaining available resource block as a probability event, wherein a probability that each remaining available resource block is utilized is equal to the set probability that the current cell utilizes each remaining available resource block.

7. The method according to claim 6, wherein the probability that each remaining available resource block is utilized being equal to the set probability that the current cell utilizes each remaining available resource block comprises:
   generating a random number according to pre-set probability density; and
   determining that the remaining available resource block is available when judging that the random number belongs to a probability distribution subinterval pre-set for the remaining available resource block;
   wherein the probability distribution subinterval pre-set for the remaining available resource block is set based on such a rule that an integration of the pre-set probability density at the probability distribution subinterval is equal to a utilization probability of the remaining available resource block.

8. The method according to claim 1, wherein the message is an HII message.

9. A device for utilizing cell edge frequency band resources, the device comprising:
a receiver;
a processor communicatively coupled to the receiver;
wherein the receiver is configured to receive a message transmitted from another cell, wherein the message is used for indicating information of an edge frequency band resource block used by the another cell; and
wherein the processor is configured to acquire information of a remaining available resource block of a current cell according to the information of the edge frequency band resource block utilized by the another cell and information of an edge frequency band resource block utilized by the current cell, and according to the acquired information of the remaining available resource block, to utilize the remaining available resource block according to a set probability that each remaining available resource block is utilized by the current cell.

10. The device according to claim 9, wherein the processor is further configured to, according to the information of the edge frequency band resource block utilized by the another cell and the information of the edge frequency band resource block utilized by the current cell, acquire information of an edge frequency band resource block not utilized by the current cell and the another cell in resource blocks of a full frequency range to serve as the information of the remaining available resource block of the current cell; or
wherein the processor is further configured to, according to pre-set correspondence between cells and modes, and a characteristic resource block of a mode, acquire utilization information of an available edge frequency band resource block of the current cell, where information of a resource block not utilized by the another cell and the current cell in the available edge frequency band resource block of the current cell is used as the information of the remaining available resource block of the current cell, wherein the characteristic resource block is a dedicated resource block designated for each mode beforehand.

11. The device according to claim 9, wherein the processor is further configured to:
generate a random number according to pre-set probability density; and
determine that the remaining available resource block is available when it is judged that the random number belongs to a probability distribution subinterval pre-set for the remaining available resource block, wherein the probability distribution subinterval pre-set for the remaining available resource block is set based on such a rule that an integration of the pre-set probability density at the probability distribution subinterval is equal to a utilization probability of the remaining available resource block.

12. The device according to claim 9, wherein the message is an HII message.

13. The device according to claim 9, further comprising a setter, configured to:
pre-set values of probabilities that the resource blocks of the full frequency range are utilized by the current cell; or
after the processor acquires the information of the remaining available resource block of the current cell, set a value of the probability that the current cell utilizes each remaining available resource block.

14. The device according to claim 13, wherein the setter is specifically configured to, starting from a last edge frequency band resource block initially allocated to the current cell and according to a frequency ascending direction or a frequency descending direction of the resource blocks, set utilization probabilities of the resource blocks in a manner that the value of the probability that the current cell utilizes each resource block is decreased gradually.

15. A base station, comprising:
a device for utilizing cell edge frequency band resources which is configured to
receive a message transmitted from another cell, wherein the message is used for indicating information of an edge frequency band resource block used by the another cell;
acquire information of a remaining available resource block of a current cell according to the information of the edge frequency band resource block utilized by the another cell and information of an edge frequency band resource block utilized by the current cell; and
according to the acquired information of the remaining available resource block, utilize the remaining available resource block based on a set probability that each remaining available resource block is utilized by the current cell.

16. The base station according to claim 15, wherein the message is an HII message.

17. The base station according to claim 15, wherein the device acquires information of a remaining available resource block of a current cell by acquiring information of an edge frequency band resource block not utilized by the current cell and the another cell in resource blocks of a full frequency range to serve as the information of the remaining available resource block of the current cell, the information being acquired according to the information of the edge frequency band resource block utilized by the another cell and the information of the edge frequency band resource block utilized by the current cell.

18. The base station according to claim 15, wherein the device is configured to acquire information of a remaining available resource block of a current cell by:
acquiring utilization information of available edge frequency band resource block of the current cell according to pre-set correspondence between cells and modes, and a characteristic resource block of a mode; and
using information of a resource block not utilized by the another cell and the current cell in the available edge frequency band resource block of the current cell as the information of the remaining available resource block of the current cell;
wherein the characteristic resource block is a dedicated resource block pre-designated for each mode.

19. The base station according to claim 15, wherein the device is configured to utilize the remaining available resource block by:
pre-setting values of probabilities that the resource blocks of a full frequency range are utilized by the current cell; or
after acquiring the information of the remaining available resource block of the current cell, setting a value of the probability that the current cell utilizes each remaining available resource block.

20. The base station according to claim 19, wherein the message is an HII message.

\* \* \* \* \*